United States Patent [19]

Cooprider et al.

[11] Patent Number: 5,571,617
[45] Date of Patent: Nov. 5, 1996

[54] PRESSURE SENSITIVE ADHESIVE COMPRISING TACKY SURFACE ACTIVE MICROSPHERES

[75] Inventors: Terrence E. Cooprider, Woodbury; Dale O. Bailey, White Bear Lake, both of Minn.; Ronald W. Most, River Falls, Wis.

[73] Assignee: Minnesota Mining and Manufacturing Company, St. Paul, Minn.

[21] Appl. No.: 270,179

[22] Filed: Jul. 1, 1994

Related U.S. Application Data

[63] Continuation-in-part of Ser. No. 174,620, Dec. 28, 1993, abandoned, which is a continuation of Ser. No. 52,386, Apr. 23, 1993, abandoned.

[51] Int. Cl.[6] .............................. B32B 7/12; B32B 27/30
[52] U.S. Cl. ...................... 428/341; 428/40.2; 428/41.5; 428/327; 428/343; 428/354; 428/355
[58] Field of Search ................................ 428/41, 42, 355, 428/354, 343, 327, 40, 341

[56] References Cited

U.S. PATENT DOCUMENTS

| | | | |
|---|---|---|---|
| Re. 24,906 | 12/1960 | Ulrich | 206/59 |
| 3,691,140 | 9/1972 | Silver | 260/78.5 |
| 3,857,731 | 12/1974 | Merrill, Jr. et al. | 428/354 |
| 4,098,945 | 7/1978 | Oehmke | 428/327 |
| 4,166,152 | 8/1979 | Baker et al. | 428/522 |
| 4,495,318 | 1/1985 | Howard | 524/375 |
| 4,598,112 | 7/1986 | Howard | 524/78 |
| 4,599,265 | 7/1986 | Esmay | 428/343 |
| 4,656,218 | 4/1987 | Kinoshita | 524/460 |
| 4,735,837 | 4/1988 | Miyasaka et al. | 428/40 |
| 4,786,696 | 11/1988 | Bohnel | 526/88 |
| 4,804,688 | 2/1989 | Vassilett | 524/423 |
| 4,822,670 | 4/1989 | Ono et al. | 428/317.3 |
| 4,994,322 | 2/1991 | Delgado et al. | 428/343 |
| 5,045,569 | 9/1991 | Delgado | 521/60 |
| 5,053,436 | 10/1991 | Delgado | 524/801 |
| 5,118,757 | 6/1992 | Silver et al. | 524/462 |
| 5,128,412 | 7/1992 | Miyasaka et al. | 525/108 |
| 5,215,818 | 6/1993 | Silver et al. | 428/343 |

FOREIGN PATENT DOCUMENTS

| | | | |
|---|---|---|---|
| 209337 | of 0000 | European Pat. Off. | |
| 0 439 941 A1 | 8/1991 | European Pat. Off. | C09J 7/02 |
| 3544882 A1 | of 0000 | Germany | |

*Primary Examiner*—Peter A. Szekely
*Attorney, Agent, or Firm*—Gary L. Griswold; Walter N. Kirn; Carolyn V. Peters

[57] ABSTRACT

A coated sheet material comprising a backing and a coating of repositionable pressure-sensitive adhesive comprising a plurality of solid microspheres, a polymeric stabilizer and an surfactant. Processes for preparing solid microspheres are also disclosed.

11 Claims, No Drawings

PRESSURE SENSITIVE ADHESIVE COMPRISING TACKY SURFACE ACTIVE MICROSPHERES

This application is a continuation-in-part of application Ser. No. 08/174,620, filed Dec. 28, 1993, now abandoned which is a continuation of application Ser. No. 08/052,386, filed Apr. 23, 1993, now abandoned.

TECHNICAL FIELD

This invention relates to repositionable adhesives, repositionable adhesive-coated sheet materials and processes for preparing repositionable adhesives.

BACKGROUND OF THE INVENTION

Positionable adhesives are those that allow for the placement of an article containing such an adhesive onto a receptor in an exact position, because the article can be adjusted relative to the receptor after initial placement.

In some instances, the adhesive can be designated repositionable or repeatedly reusable. As used herein, the term "repositionable" refers to the ability to be repeatedly adhered to and removed from a substrate without substantial loss of adhesion capability. Such adhesives exhibit aggressive tack but low peel adhesion properties, thus allowing repeated reusability. Commercial products such as the 3M brand Post-It™ Notes display such adhesive characteristics.

Solid, inherently tacky, elastomeric microspheres are known in the art to be useful in repositionable adhesive applications. Microsphere-based adhesives are thought to perform well in such applications at least in part due to their "self-cleaning" nature wherein substrate contaminants tend to be pushed aside and trapped between the microspheres as the adhesive is applied. Upon removal, the adhesive still presents a relatively uncontaminated surface for reapplication to the substrate.

One problem associated with these types of adhesives has been microsphere transfer, i.e., microsphere loss to a receptor. That is, microsphere loss from a substrate on which the microsphere has been positioned to a surface to which the substrate has been adhered by the microsphere. To alleviate this problem, binders or primers have been utilized.

SUMMARY OF THE INVENTION

In one aspect, the present invention provides a sheet material comprising a backing and a coating of repositionable pressure-sensitive adhesive coated on at least one major surface of the backing, the adhesive comprising i) a plurality of polymeric, solid, elastomeric microspheres that are the reaction product of reactants comprising polymerizable starting materials comprising at least one $C_4$–$C_{14}$ alkyl (meth)acrylate monomer and at least one polar comonomer which, if the polar comonomer comprises a dissociable proton, has no dissociable proton having a $K_d$ of greater than $10^{-3}$;

ii) a polymeric stabilizer in an amount of between about 0.1 and about 3 parts by weight per 100 parts by weight of the microspheres (preferably about 0.5 to about 2 parts by weight per 100 parts by weight of the microspheres); and iii) a surfactant in an amount of no greater than about 5 parts by weight per 100 parts by weight of the microspheres (preferably about no greater than 3 parts by weight and most preferably in the range of 0.1 to about 1.5 parts by weight per 100 parts by weight of the microspheres). As used in this application, the notation "(meth)acrylate" refers to acrylate and methacrylate.

In another aspect, the present invention provides a one step suspension polymerization process for preparing polymeric, solid, elastomeric microspheres comprising the steps of:

a) stirring or agitating a mixture comprising polymerizable monomer starting materials comprising at least one $C_4$–$C_{14}$ alkyl (meth)acrylate monomer and a polar comonomer which, if the polar comonomer comprises a dissociable proton, has no dissociable proton having a $K_d$ greater than $10^{-3}$; an initiator for the polymerizable monomer starting materials; a polymeric stabilizer in an amount in the range of 0.1 to about 3 parts by weight per 100 parts by weight of the polymerizable monomer starting materials; a surfactant in an amount of no greater than about 5 parts by weight per 100 parts by weight of polymerizable monomer, preferably no greater than about 3 parts by weight and most preferably in the range of 0.1 to 1.5 parts by weight; and water to form an oil in water suspension; and b) polymerizing the (meth)acrylate monomer(s) and the polar comonomer(s); wherein solid microspheres are provided.

In yet another aspect, the present invention provides a two-step suspension polymerization process for preparing polymeric, solid, elastomeric microspheres from polymerizable monomer starting materials, the process comprising the steps of:

a) stirring or agitating a mixture comprising at least one $C_4$–$C_{14}$ alkyl (meth)acrylate monomer; an initiator for the monomer; a polymeric stabilizer in an amount of about 0.1 to about 3 parts by weight per 1 00 parts by weight of the polymerizable monomer starting materials; a surfactant in an amount of no greater than about 5 parts by weight per 100 parts by weight of the polymerizable monomer starting materials, preferably no greater than 3 parts by weight and most preferably in the range of 0.5 to 2 parts by weight; and water to form an oil in water suspension;

b) at least partially polymerizing the polymerizable monomer starting materials;

c) adding to the suspension a polar comonomer(s) which, if the polar comonomer(s) comprise a dissociable proton, have no dissociable proton having a $K_d$ greater than $10^{-3}$; and d) continuing the polymerization of the polymerizable monomer starting materials; wherein microspheres are provided.

It is desirable to make a pressure sensitive adhesive with improved adhesion and yet repositionable without fiber pick-up. There are several criteria indicated for such an adhesive.

First, a solid, well-formed microsphere is desirable because such microspheres provide resposititionability at high microsphere coating weights because of improved topology of the coating surface.

Second, it is desirable to have improved adhesion to particular surfaces, such that the adhesive strength remains constant or slightly builds after a period of time.

Third, it is desirable that the impurities in the coating solution, such as surfactants, polymeric protective colloids, be minimized to maintain the high adhesion level. Typically, this would result in coatings that are process unstable because of shear. Surprisingly, this problem is eliminated and the microspheres of the present invention improve process stability because of shear in fluid handling.

Fourth, it is desirable to develop a microsphere adhesive that adheres to a substrate or backing and easily removes from applied surfaces without transferring or leaving an adhesive residue on the applied surface.

The microsphere-containing adhesives prepared according to the processes of the present invention can advantageously be coated from water, thus eliminating limitations associated with solvent coating. Furthermore, the combination of surfactant and stabilizer as used in the present invention produces microspheres that are essentially all solid (meth)acrylate microspheres, although there may be a detectable number of hollow or hollow-appearing microspheres, without indications of coagulation or agglomeration during the suspension polymerization process. Depending on the comonomers selected and the reaction/polymerization conditions, the microspheres maybe up to 90–95% solvent soluble. Further, depending on the combination of comonomers, surfactant and stabilizer the microspheres are water dispersible, that is, the microspheres can be diluted with water and formulated with water soluble material, but once dried do not redisperse in water.

The microsphere-containing adhesives of the present invention advantageously exhibit improved release characteristics (higher adhesion without fiber pick-up), excellent anchorage to a coated substrate, excellent adhesion to various surfaces (textured surfaces, glass, vinyl), and improved shear holding (hang adhesion). All the improved characteristics are achievable without losing a soft, smooth removal, that is, a non-raspy removal.

DESCRIPTION OF THE PREFERRED EMBODIMENT(S)

The microspheres obtained in the present invention are the reaction product of (i) at least one alkyl (meth)acrylate ester wherein the alkyl group contains four to about 14 carbon atoms, preferably four to about 10 carbon atoms, and (ii) a polar comonomer which, if it comprises dissociable proton, has no dissociable proton having a $K_d$ of greater than $10^{-3}$, preferably no greater than $10^4$.

Useful alkyl (meth)acrylate monomers are those monofunctional unsaturated (meth)acrylate esters, the alkyl groups of which have from 4 to 14 carbon atoms. Such (meth)acrylates are oleophilic, water dispersible, and are essentially water insoluble. Furthermore, useful (meth)acrylates are those that as homopolymers, generally have a glass transition temperature below about −20° C., or if a combination of monomers is used, such combination would produce a copolymer or terpolymer generally having a glass transition temperature below about −20° C. Nonlimiting examples of such (meth)acrylates included but are not limited to, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, t-butyl acrylate, t-butyl methacrylate, isobornyl acrylate, methylmethacrylate, isononyl acrylate, isodecyl acrylate and the like, and combination thereof.

Preferred alkyl (meth)acrylate monomers include isooctyl acrylate, isononyl acrylate, isoamyl acrylate, isodecyl acrylate, 2-ethylhexyl acrylate, n-butyl acrylate, sec-butyl acrylate and mixtures thereof.

Suitable polar comonomers may or may not contain a dissociable hydrogen. In any case, the polar comonomer is one that exhibits a balance of solubility properties in the alkyl (meth)acrylate monomer and water phases of the dispersion obtained when the alkyl (meth)acrylate monomer is dispersed in water to provide a significant amount of polar comonomer at or near the interfaces of the two phases, that is, differential solubility of the polar comonomer tends to result in a higher polymerizable concentration at or near the surface of the alkyl (meth)acrylate monomer droplet. Inclusion of the polar comonomer provides microspheres that generally exhibit less tendency to transfer to substrates to which adhesive-coated sheet materials of the invention have been adhered.

One class of suitable polar comonomers having no dissociable proton are amino-functional monomers having a nucleus or portion of the nucleus of the general formula (1):

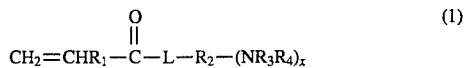

(1)

wherein $R_1$ is H, —$CH_3$, —$CH_2CH_3$, cyano or carboxymethyl;

$R_2$ is a hydrocarbyl radical comprising 1 to about 4 carbon atoms;

$R_3$ and $R_4$ are independently H or an alkyl group containing 1 to about 4 carbon atoms or an arylalkyl group or together form a cyclic or heterocyclic moiety, with the proviso that $R_3$ and $R_4$ together do not exceed a total of 8 carbon atoms;

L is a carbon-carbon bond, O, NH or S; and x is an integer of 1 to 3.

Nonlimiting examples of comonomers of formula 1 include N,N-dimethyl-aminoethyl(meth)acrylate, N,N-dimethylaminopropyl(meth)acrylate, t-butylaminoethyl-(meth)acrylate and N,N-diethylaminoacrylate.

Another class of suitable polar comonomers having no dissociable proton are hydroxylic comonomers having a nucleus or portion of the nucleus of the general formula (2):

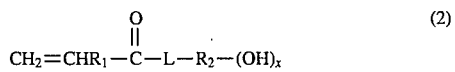

(2)

wherein $R_1$ is H, —$CH_3$, —$CH_2CH_3$, cyano or carboxymethyl;

$R_2$ is a hydrocarbyl radical comprising 1 to about 4 carbon atoms;

L is a carbon-carbon bond, O, NH or S; and x is an integer of 1 to 3.

Nonlimiting examples of polar comonomers of formula 2 include hydroxyethyl (meth)acrylate, 3-hydroxypropyl (meth)acrylate, glycerol mono(meth)acrylate and 4-hydroxybutyl (meth)acrylate.

Yet another class of suitable polar comonomers having no dissociable proton are amido-functional monomers having a nucleus or portion of the nucleus of the general formula (3):

(3)

wherein $R_1$ is H, —$CH_3$, —$CH_2CH_3$, cyano or carboxymethyl; and $R_3$ and $R_4$ are independently H or an alkyl group containing 1 to about 4 carbon atoms or an arylalkyl group or together form a cyclic or heterocyclic moiety, with the proviso that $R_3$ and $R_4$ together do not exceed a total of 8 carbon atoms.

Nonlimiting examples of polar comonomers of formula 3 include N-vinyl pyrrolidone, N-vinyl caprolactam, acrylamide or N,N-dimethyl acrylamide.

Nonlimiting examples of other suitable polar comonomers that do not fall within the above classes and have no dissociable proton include (meth)acrylonitrile, furfuryl (meth)acrylate and tetrahydrofurfuryl (meth)acrylate, 2-vinyl pyridine, and 4-vinyl pyridine.

Suitable polar monomers having a dissociable proton are organic carboxylic acids comprising three to about 8 carbon atoms and having generally one to about 4 carboxylic acid moieties. Nonlimiting examples of polar monomers that comprise a dissociable proton, but not a dissociable hydrogen having a $K_d$ of greater than about $10^{-3}$ include acrylic acid, methacrylic acid, itaconic acid, fumaric acid and crotonic acid.

Generally, the relative amounts by weight of the alkyl (meth)acrylate monomer(s) and the polar comonomer used will be about 99.5/0.5 to 85/15, and will preferably be 98/2 to 92/8.

The microsphere adhesive composition may also contain a crosslinking agent. Examples of useful crosslinking agents include, but are not limited to: multifunctional (meth)acrylate(s), e.g., butanediol diacrylate or hexanediol diacrylate or other multifunctional crosslinkers such as divinylbenzene and mixtures thereof. When used, crosslinker(s) is (are) added at a level of up to about 0.15 equivalent weight percent, preferably up to about 0.1 equivalent weight percent, of the total polymerizable composition.

The microspheres of the present invention are prepared by suspension polymerization using either a one-step or two-step process as described in detail below. Suspension polymerization is a procedure wherein a monomer is dispersed in a medium (usually aqueous) in which it is insoluble. The polymerization is allowed to proceed within the individual polymer droplets. Monomer soluble free-radical initiators are used. The kinetics and the mechanism are essentially those for the corresponding bulk polymerization under the same conditions of temperature and initiator concentration.

Initiators effecting polymerization are those that are normally suitable for free-radical polymerization of acrylate monomers. Examples of such initiators include thermally-activated initiators such as azo compounds, hydroperoxides, peroxides and the like and photoinitiators such as benzophenone, benzoin ethyl ether and 2,2,-dimethoxy-2-phenyl acetophenone. Other suitable initiators include lauroyl peroxide and bis(t-t-butyl cyclohexyl)peroxy dicarbonate. The initiator is present in a catalytically effect amount sufficient to bring about complete monomer conversion in a predetermined time span and temperature range.

Parameters that affect the concentration of initiator employed include the type of initiator and particular monomer and/or monomers involved. It is believed that catalytically effective concentrations range from about 0.10 to about 1 percent by weight of the total monomers and more preferably, from about 0.25 to about 0.70 percent by weight monomers and/or monomers.

A polymeric stabilizer is also utilized. Advantageously, the presence of the stabilizer permits use of relatively low amounts of surfactant while still obtaining desirable solid microspheres. Minimization of the amount of surfactant and the relatively low amount of polymeric stabilizer employed desirably permits the ability of coating the aqueous dispersion of finished microspheres directly onto a backing to obtain an adhesive-coated sheet material exhibiting desirable adhesive properties.

Preferred polymeric stabilizers that assist in the preparation of the microspheres typically have an interfacial tension sufficient to stabilize final polymerized droplets and prevent agglomeration. Interfacial tension herein means the value determined between the monomer phase and a 1.0 percent by weight aqueous solution of the stabilizer and such interfacial tensions are generally above about 15.0 dynes per centimeter.

Exemplary stabilizers include salts of polyacrylic acids of greater than 5000 molecular weight (e.g., the ammonium, sodium, lithium and potassium salts), carboxy modified polyacrylamides (e.g., Cyanamer™ A-370 from American Cyanamid), copolymers of acrylic acid and dimethylaminoethylmethacrylate and the like, quarternary amines (e.g., General Analine and Film's Gafquat™ 755, a quarternized polyvinyl-pyrolidone copolymer, or Union Carbide's "JR-400", a quarternized amine substituted cellulosic), and carboxy modified cellulosics (e.g., Hercules' Natrosol™ CMC Type 7L, sodium carboxy methycellulose).

Generally, the polymeric stabilizer will be present in the reaction mixture in an amount by weight of about 0.1 to about 3 parts by weight per 100 parts of polymerizable monomer, and more preferably will be present in an amount by weight of about 0.5 to about 1.5 parts by weight per 100 parts of polymerizable monomer. Polymeric stabilizers can be added to the reaction mixture either singly or as mixture of several stabilizers, the amount of which does not exceed that of a single stabilizer.

In addition, a surfactant is utilized in a concentration greater than the critical micelle concentration (CMC) which is defined as that minimum concentration that is necessary for micelle formation. This concentration can vary with each emulsifier. Generally, the surfactants will be present in the reaction mixture in an amount by weight of no greater than 5 parts by weight per 100 parts by weight of polymerizable monomer, preferably no greater than 3 parts by weight, and most preferably in the range of 0.1 to 1.5 parts by weight per 100 parts by weight of polymerizable monomer. Surfactants can be added to the reaction mixture either singly or as mixture of several surfactants, the amount of which does not exceed that of a single surfactant.

Useful surfactants include anionic, cationic or nonionic surfactants and included but are not limited to anionic surfactants, such as alkyl aryl sulfonates, for example sodium dodecylbenzene sulfonate and sodium decylbenzene, sodium and ammonium salts of alkyl sulfates, for example sodium lauryl sulfate, and ammonium lauryl sulfate; nonionic surfactants, such as ethoxylated oleyl alcohol and polyoxyethylene octylphenyl ether; and cationic surfactants, such as a mixture of alkyl dimethylbenzyl ammonium chlorides wherein the alkyl chain contains from 10 to 18 carbon atoms. Amphoteric emulsifiers are also useful in the present invention and include for example betaine derivatives, sulfobetaine derivatives, N-fatty aminopropionate, N-fatty aminobutyrate, alkyl imidazoline and mixtures thereof.

To initiate the polymerization reaction, a sufficient number of free radicals must be present. This may be achieved through several means that are well known in the art, such as heat or radiation free-radical initiation. For example, heat or radiation can be applied to initiate the polymerization of the monomers, which is an exothermic reaction. However, it is preferred to apply heat until thermal decomposition of the initiators generates a sufficient number of free radicals to begin the reaction. The temperature at which this occurs varies greatly depending upon the initiator used.

In addition, deoxygenation of the polymerization reaction mixture is often desirable. It is well known that oxygen dissolved in the reaction mixture can inhibit polymerization and it is desirable to expel this dissolved oxygen. Although, an inert gas bubbled into the reaction vessel or through the reaction mixture is an effective means of deoxygenation, other techniques for deoxygenation that are compatible with suspension polymerization can be used. Typically, nitrogen is used to deoxygenate, although any of the Group VIIIA (CAS version) inert gases, or carbon dioxide are also suitable.

While specific time and stirring speed parameters are dependent upon monomers, initiators, it is desirable to predisperse the reaction mixture until the reaction mixture reaches a state where the average monomer droplet size is between about 5 µm and 80 µm and preferably between 30 µm and 60 µm. The average particle size decreases with increased and prolonged agitation of the reaction mixture.

The stirring and the nitrogen purge are maintained throughout the reaction period. Initiation is begun by heating the reaction mixture. Following polymerization, the reaction mixture is cooled.

In the one-step process both the alkyl (meth)acrylate monomer and the polar comonomer are present together in the suspension at the initiation of polymerization. In the two-step process the polar comonomer is typically added after the initial exotherm resulting from polymerization of the alkyl (meth)acrylate monomer has peaked, but could be added at any point after polymerization has started.

Following polymerization, a stable aqueous suspension of microspheres at room temperature is obtained. The suspension may have non-volatile solids contents of from about 10 to about 60 percent by weight. Upon prolonged standing, the suspension typically separates into two phases, one phase being aqueous and essentially free of polymer and the other phase being an aqueous suspension of the polymeric microspheres, that is, the microsphere-rich phase. The aqueous suspension of microspheres may be utilized immediately following polymerization, because the suspension of microspheres of the present invention is particularly stable to agglomeration or coagulation under room temperature conditions. Advantageously, the microspheres of the present invention can be easily coated from an aqueous solution. Surprisingly, the microspheres of the present invention are well suited for conventional coating techniques and have enhanced fluid processing characteristics.

Separation of the microsphere-rich phase provides an aqueous suspension having a non-volatile solids content, which if diluted with an additional amount of water, will readily redisperse upon shaking or other means of agitation. Generally, this aqueous suspension can be coated onto a backing or other substrate being employed using conventional coating methods, such as slot die coating to provide an adhesive coating. The adhesive coating which, when dried, preferably exhibits a dry coating weight in the range of 0.4 to about 2 grams per square foot to provide an adhesive-coated sheet material in which the adhesive coating comprises polymeric microspheres, polymeric stabilizer and surfactant. Alternatively, the microspheres may be isolated in an organic solvent if desired prior to coating them onto the backing.

Properties of the pressure-sensitive adhesives of the present invention can be altered by the addition of a tackifying resin(s) and/or plasticizer(s). Preferred tackifiers for use herein include hydrogenated rosin esters commercially available from such companies as Hercules, Inc. under the tradenames of Foral™ and Pentalyn™. Tackifying resins also include those based on t-butyl styrene. Useful plasticizers include but are not limited to dioctyl phthalate, 2-ethyl hexyl phosphate, tricresyl phosphate and the like. If such tackifiers and/or plasticizers are used, the amounts used in the adhesive mixture are amounts effective for the known uses of such additives.

Optionally, adjuvants, such as, colorants, fillers, stabilizers, pressure-sensitive latex binders and various other polymeric additives can be utilized. If such adjuvants are used, the amounts used in the adhesive mixture are amounts effective for the known uses of such adjuvants.

Suitable backing or substrate materials for use in the present invention include, but are not limited to, paper, plastic films, cellulose acetate, ethyl cellulose, woven or nonwoven fabric formed of synthetic or natural materials, metal, metallized polymeric film, ceramic sheet material and the like. Generally the backing or substrate material is about 50 µm to about 155 µm in thickness, although thicker and thinner backing or substrate materials are not precluded.

The present invention is further illustrated by the following examples, but the particular materials and amounts thereof recited in these examples, as well as other conditions and details, should not be construed to unduly limit this invention. All materials are commercially available or known to those skilled in the art unless otherwise stated or apparent. The following examples are illustrative in nature and are not intended to limit the invention in any way.

TEST METHODS

Static Shear Hold

Static shear hold is determined as the hanging time for an adhesive coated substrate applied to a stainless steel plate when a weight is attached. The procedure followed is:

A 1×½ inch (2.5×3.8 cm) sample of the adhesive coated substrate is adhered to a polished steel plate with a 4.5 pound (2 kg) roller. The plate is hung vertically and a 1 kg weight is attached to the free end of the adhesive stripe. A timer is started and the length of time for the adhesive coated sample to release and fall from the steel plate is measured in minutes.

Peel Adhesion

Peel adhesion is the force required to remove a polyester film applied to the coated test material measured at a specific angle and rate of removal. In the examples, this force is expressed in grams per 1.25 inches (3.2 cm) width of coated sheet. The procedure followed is:

A strip, 1.25 inches (3.2 cm) wide, of polyester film is applied to the horizontal surface of a coated sample fixed on a test plate. A 4.5 lb. (2 kg) hard rubber roller is used to apply the strip. The free end of the polyester film is attached to the adhesion tester load cell so that the angle of removal will be 90 degrees. The test plate is then clamped in the jaws of the tensile testing machine that is capable of moving the plate away from the load cell at a constant rate of 12 inches (31 cm) per minute. A load cell reading in grams per 1.25 inches (3.2 cm) of coated strip is recorded as the polyester film is peeled from the coated samples. The samples are tested three times. The average of the three tests is reported below.

Microsphere Transfer

Microsphere transfer for the purposes of this test is defined as the amount of microsphere that transfers to an applied paper when the coated sample is removed from the paper. It is measured as the percent of the area covered with microspheres. The procedure followed is:

A three-quarter (¾) (1.9 cm) wide strip of microsphere coated sample is adhered to a clean area of a clay coated paper commercially available as Kromcoat, for a few seconds using the mechanical rolling action provided by an TLMI release and adhesion tester and then is removed at a 90° degree angle at a constant rate. The clay coated strip is then surveyed by an image processor through a video camera and the percent microsphere coverage of the viewed area is recorded. Ten fields were surveyed on each test sample and the average of these readings is recorded.

Glossary

AA—acrylic acid
ACM—acrylamide
CRA—crotonic acid
FA—fumaric acid
HEMA—hydroxyethyl methacrylate
IOA—isooctyl acrylate
IPA—isopropyl alcohol
ITA—itaconic acid
NVP—N-vinyl pyrrolidone

EXAMPLES

Example 1

To a 2 liter, 3 necked flask equipped with thermometer, reflux condenser, mechanical stirrer and nitrogen inlet tube, were charged 739 grams of deionized water, and 9.6 grams of Acrysol™ A3 (tradename for a 25 percent solids aqueous solution of polyacrylic acid of 190,000 molecular weight, commercially available from the Rohm and Haas Company) and 10 grams of Triton™ X 200 (tradename for a 28% solids aqueous suspension of sodium alkylaryl polyether sulfonate, commercially available from Rohm and Haas Company). The contents of the flask were then agitated and concentrated ammonium hydroxide was added there to until a pH of 7.0 was obtained and heated 70° C. To this solution were added 239 grams of isooctylacrylate and 0.8 grams of Perkadox™ 16N (tradename for a 94.5% active BIS (4-tert-butyl cyclohexyl) peroxydicarbonate initiator commercially available from AKZO Chemicals, Inc. The agitation was set at 600 revolutions per minute (rpm) and the reaction mixture was purged with nitrogen. The stirring and nitrogen purge were maintained throughout the reaction period. The reaction mixture was maintained at 65° C. to initiate the reaction. The reaction became exothermic after a few minutes of heating. After the exotherm had peaked (80° C.), 14.8 grams of acrylic acid was added slowly to the reaction flask and the batch was heated to 90° C. for two hours. The reaction mixture was then cooled to room temperature and filtered through a cheese cloth. Very little coagulum was observed to be present.

The vinylic moiety, the amount of vinylic moiety, the peel adhesion, and the microsphere transfer are summarized in Table 1.

Example 2–5

Examples 2–5 illustrate the use of various vinylic moieties. The microspheres of these Examples were prepared in accordance with the procedures outlined in Example 1. The vinylic moiety, the amount of vinylic moiety, the peel adhesion, and the microsphere transfer are summarized in Table 1.

Comparative Example C1

Comparative Example C1 was prepared in accordance with the procedures outlined in Example 1 except that no acrylic acid was added after exotherm.

The test results are reported in Table 1.

TABLE 1

| Ex | Monomer | Vinylic Moiety (gm) | Peel Adhesion (g/1.25 in.) | Microsphere Transfer |
|---|---|---|---|---|
| 1 | AA | 14.8g | 117.1 | 6.9 |
| 2 | HEM | 19.0g | 75.2 | 1.2 |
| 3 | NVP | 19.0g | 89.4 | 1.09 |
| 4 | Acm | 19.0g | 84.5 | 1.3 |
| 5 | AA/Acm | 9.5/9.5 | 88.5 | 0.30 |
| C1 | — | — | 66.8 | 30.0 |

Example 6

To a two liter, 3-necked flask equipped with a thermometer, mechanical stirrer and nitrogen inlet tube, was charged 650 grams of deionized water, 5.8 gm of Triton™ X 200 (tradename for 28% solids aqueous suspension of sodium alkyl arylpolyether sulfonate commercially available from Rohm and Haas Company), 14 gm of Acumer™ IS-30 (tradename for a 25 percent solids aqueous solution of polyacrylic acid of 190,000 molecular weight, commercially available from Rohm and Haas Company), 2.8 gm of concentrated ammonium hydroxide (a stoichiometric amount of base to give ammonium polyacrylate), and 14 gms of acrylic acid. To this solution was added 350 gms of isooctylacrylate and 1.1 gms of Perkadox™ 16N (tradename for a 95% active bis(4-tert-butylcyclohexyl) peroxydicarbonate initiator commercially available from AKZO Chemicals, Inc.). The agitation was set at 450 revolutions per minute (RPM) and the reaction mixture was heated to 45° C. and purged with nitrogen. The stirring, nitrogen purge and temperature was maintained throughout the reaction period, the reaction was exothermic after a few minutes and peaked at 69° C. The batch was maintained at 45° C. for two more hours, cooled, and filtered through cheese cloth. Very little coagulum was found to be present. The resulting suspension was found to contain microspheres of an average particle size of 77.6 microns which on creaming had a lower phase solids of 2% by weight. Microscopic examination showed the microsphere to be a solid sphere.

Examples 7–20

Examples 7–20 included in Table 2 below illustrate the use of various polar vinylic monomers, stabilizers or surfactants. The microspheres of these examples were prepared in accordance with the procedures outlined in Example 6. The polar monomer, surfactant type, and stabilizer type along with the particle size, coagulum and lower phase solids are also reported. The data shows that at relatively low concentrations of surfactant (0.5% of monomer concentration) stable microsphere dispersions can be made with the addition of a stabilizer and a polar vinylic comonomer.

Comparative Example C2

Comparative Example C2 was prepared in accordance with the procedure described in Example 7, except no stabilizer was added to the reaction mixture. The results are summarized in Table 2 and indicate that without the stabilizer, the reaction mixture coagulates.

Comparative Example C3

Comparative Example C3 was prepared in accordance with Example 18, except no comonomer was added in the reaction mixture. The results are summarized in Table 2 and indicates that without the comonomer, the reaction mixture coagulates.

TABLE 2

| Sample No. | Surfactant | Stabilizer | Comonomer | Initiator | Coagulum (% by weight) | Particle Size (micrometer) | Lower Phase Solids (% by weight) |
|---|---|---|---|---|---|---|---|
| 6 | 5.8 gm Triton™ X200 | 14 gm Acumer™ 15-30 (Neutralized) | 14 gm acrylic acid | 1.1 gm Perkadox™ 16 | None | 77.6 | 2.0 |
| 7 | 3.5 gm Polystep™ LAS50[1] | 7 gm Acumer™ 15-30 (Neutralized) | 14 gm acrylic acid | 1.1 gm Perkadox™ 16 | None | 44.6 | 1.0 |
| 8 | 5.8 gm Polystep™ B7[2] | 7 gm Acumer™ 15-30 (Neutralized) | 14 gm acrylic acid | 1.1 gm Perkadox™ 16 | None | 46.5 | 1.1 |
| 9 | 5.8 gm Polystep™ B5[3] | 7 gm Acumer™ 15-30 (Neutralized) | 14 gm acrylic acid | 1.1 gm Perkadox™ 16 | None | 47.5 | 1.0 |
| 10 | 1.8 gm Polystep™ A13[4] | 7 gm Acumer™ 15-30 (Neutralized) | 14 gm acrylic acid | 1.1 gm Perkadox™ 16 | None | 55.8 | 1.1 |
| 11 | 1.8 gm Siponate™ DS10[5] | 11.5 gm polyacrylamide (High Carboxyl)[8] | 14 gm hydroxy ethyl methacrylate | 1.1 gm Perkadox™ 16 | None | 47.9 | 1.6 |
| 12 | 6.2 gm Stephanol™ AM[6] | 23 gm polyacrylamide (High Carboxyl)[8] | 3.5 gm acrylic acid | 1.4 gm benzoyl peroxide (70%) | 2% | 38.5 | 5.5 |
| 13 | 1.8 gm Siponate™ DS10[5] | 7 gm Goodrite™ K702 (Neutralized)[7] | 14 gm N-vinyl pyrrolidone | 1.1 gm Perkadox™ 16 | 1% | 54.4 | 0.9 |
| 14 | 3.8 gm Stephanol™ AM[6] | 7 gm Goodrite™ K702 (Neutralized)[7] | 14 gm N-vinyl caprolactam | 1.1 gm Perkadox™ 16 | 0.5% | 46.5 | 1.5 |
| 15 | 5.8 gm Triton™ X200 | 11.5 gm polyacrylamide (High Carboxyl)[8] | 14 gm acrylic acid | 1.1 gm Perkadox™ 16 | 1% | 78.7 | 1.4 |
| 16 | 6.2 gm Stepanol™ AM[6] | 14 gm Goodrite™ K702 (Neutralized)[7] | 14 gm acrylic acid | 1.1 gm Perkadox™ 16 | 2% | 48.0 | 2.7 |
| 17 | 6.2 gm Stepanol™ AM[6] | 23 gm polyacrylamide (High Carboxyl)[8] | 14 gm acrylic acid | 1.4 gm benzoyl peroxide (70%) | 2% | 49.2 | 4.2 |
| 18 | 6.2 gm Stepanol™ AM[6] | 7 gm Goodrite™ K702 (Neutralized)[7] | 14 gm hydroxy ethyl methacrylate | 1.1 gm Perkadox™ 16 | 0.50% | 57.3 | 1.5 |
| 19 | 6.2 gm Stepanol™ AM[6] | 7 gm Goodrite™ K702 (Neutralized)[7] | 14 gm N-vinyl pyrrolidone | 1.1 gm Perkadox™ 16 | None | 71.4 | 1.4 |
| 20 | 6.2 gm Stepanol™ AM[6] | 14 gm Goodrite™ K702 (Neutralized)[7] | 3.5 gm acrylic acid and 10.5 gm acrylamide | 1.1 gm Perkadox™ 16 | 2% | 51.8 | 3.7 |
| C2 | 3.5 gm Polystep™ LAS50[1] | None | 14 gm acrylic acid | 1.1 gm Perkadox™ 16 | 100% | NA | NA |
| C3 | 6.2 gm Stepanol AM[6] | 7 gm Goodrite™ K702 (Neutralized)[7] | None | 1.1 gm Perkadox™ 16 | 100% | NA | NA |

[1] Polystep™ LAS50 is a 50% solids solution of sodium dodecyl benzene sulfonate commercially available from Stepan Company.
[2] Polystep™ B7 is a 30% solids solution of ammonium lauryl sulfate commercially available from Stepan Company.
[3] Polystep™ B5 is a 30% solids solution of sodium lauryl sulfate commercially available from Stepan Company.
[4] Polystep™ A13 is a 97% active linear dodecylbenzene sulfonic acid commercially available from Stepan Company (neutralized with ammonia).
[5] Siponate™ DS10 is flakes of sodium dodecyl benzene sulfonate commercially available from Alcolac Inc.
[6] Stepanol™ AM is a 29% solids solution of ammonium lauryl sulfate commercially available from Stepan Company.
[7] Goodrite™ K702 is a 25% solids solution of polyacrylic acid commercially available from BF Goodrich Company.
[8] This is a 15% solids solution of polyacrylamide (high carboxyl modified) commercially available from Aldrich Chemical (neutralized with ammonia).

Example 21

To a 2 liter, 3 necked flask equipped with thermometer, reflux condenser, mechanical stirrer and nitrogen inlet tube were charged 650 gm of deionized water, and 7 gm of Goodrite™ K702 (tradename for a 25% solids aqueous solution of polyacrylic acid of 240,000 molecular weight, commercially available from B.F. Goodrich Company) and 1.8 gms of Siponate™ DS10 (tradename for sodium dodecylbenzene sulfonate, commercially available from Alcolac, Inc.) The contents of the flask were then agitated and concentrated ammonium hydroxide was added thereto until a pH of 7.0 was obtained. The flask was heated to 50° C. and 14 gms of N-vinylpyrrolidone, 1.1 gms of Perkadox™ 16N (tradename for 94.5% active bis-(4-tert-butyl cyclohexyl) peroxydicarbonate initiator commercially available from AKZO Chemical Inc.), and 350 gms of isooctylacrylate were added and the agitation was set at 410 rpm. The reaction mixture was purged with nitrogen and became exothermic after a few minutes of heating. The 50° C. batch temperature was maintained for five hours and the mixture cooled to room temperature and filtered through cheese cloth. Very little coagulation was observed and the resulting suspension was found to contain microspheres of an average particle size of 40.5 microns. This suspension was made into a coating by adding 153 gms to 13 gms of the suspension of an isooctylacrylate/acrylic acid copolymer latex (monomer ratio was 96/4) and 3 gms of Acrysol™ ASE95 (an 18% solids acrylic thickener commercially available from Rohm and Haas Company) and 32 gms of water. This coating was mixed and neutralized with concentrated ammonium hydroxide to pH 7.0 and coated on a primed backing of bond paper at a rate of 0.8 gm/sq. ft. The results are tabulated in Table 3 below.

TABLE 3

| | |
|---|---|
| Peel adhesion to polyester (grams/1.25 inches) | 125.1 |
| Peel adhesion to bond paper (grams/inch) | 93.4 |
| Percent microsphere transfer | 0.8% |
| Static shear hold | 653 minutes |

Examples 22–24

Examples 22–24 illustrate the improvement in anchorage by increasing the amount of acrylic acid in the microspheres. These were prepared according the procedure described in Example 18 and were made into a coating with 4% of an acrylate terpolymer latex containing an N-alkyl substituted acrylamide available from BF Goodrich under the tradename of Hycar™ 2600×222 and 1% of an acid containing acrylic emulsion copolymer thickener available from Rohm and Haas Co. under the tradename Acrylsol™ ASE 95 NP. The coatings were applied to a primed bond paper using coating procedures known in the art. The test results are summarized in Table 4.

Comparative Examples C4 (a) and (b)

Comparative Examples C4 (a) and (b) were prepared according to the procedure described in Examples 17–19, except there was no acrylic acid added. To prepared a microsphere suspension that did not coagulate and was coatable, sodium propinate and ethylene amine hydrochloride were added in place of the co-monomer (C4 (a)) and (C4 (b)), respectively.

TABLE 4

| Example | Microsphere IOA/AA Ratio | Peel Adhesion (gm/1.25") to polyester film | Percent Microsphere Transfer |
|---|---|---|---|
| C4 (a) | 100 | 66.3 | 25.9 |
| C4 (b) | 100 | 71.0 | 26.4 |
| 22 | 99.5/0.5 | 93.6 | 21.7 |
| 23 | 99.0/1.0 | 91.6 | 4.2 |
| 24 | 96.0/4.0 | 92.0 | 0.1 |

The data shows a decrease in transfer as the percent of acrylic acid increases.

Examples 25–27

Examples 25–27 illustrate the build of adhesion on aging using different polar comonomers. These examples were prepared using the procedure described in Example 18 and coating using techniques known to those skilled in the art. Peel adhesions were measured according to the above-described procedures. The test results are summarized in Table 5.

TABLE 5

| | | Peel Adhesion (gm/inch) | | | |
|---|---|---|---|---|---|
| Example | % Polar Comonomer | Bond Initial | Bond 3-days humidity | Vinyl Initial | Vinyl 3-days humidity |
| 25 | 4% AA | 98.1 | 202.8 | 108.9 | 36.6 |
| 26 | 4% HEMA/ 1% AA | 120.9 | 161.9 | 114.5 | 48.5 |
| 27 | 4% NVP/ 0.5% AA | 113.6 | 181.5 | 132.8 | 233.8 |

The data shows an increase in the adhesion on aging with acrylic acid MSA against bond paper and a decrease in adhesion when aged against a vinyl notebook. However, N-vinyl pyrrolidone microspheres show a significant increase in adhesion to vinyl on aging at high humidity (80% RH at 70° F.).

Examples 28–30

Examples 28–30 illustrate the effect of polar comonomer in isooctylacrylate microspheres when hanging on a vertical surface, such as a painted metal. The samples were prepared as described in Example 18 and were cut to apply a 1"×1.5" (2.5×3.8 cm) area of adhesive coated paper to the metal surface. The paper was then hung vertically with a 1 kg weight attached to the paper extending from the edge of the painted metal. The time before shear failure was then recorded. The results are summarized in Table 6.

TABLE 6

| Example | % Polar Comonomer | Static Shear Hold Time to Painted Metal (min) |
|---|---|---|
| 28 | 4% AA | 34.4 |
| 29 | 4% HEMA/1% AA | 20.2 |
| 30 | 4% NVP/0.5% AA | 194.5 |

Various modifications and alterations of this invention will become apparent to those skilled in the art without departing from the scope and principles of this invention, and it should be understood that this invention is not be unduly limited to the illustrative embodiments set forth hereinabove. All publications and patents are incorporated herein by reference to the same extent as if each individual publication or patent was specifically and individually indicated to be incorporated by reference.

We claim:

1. A sheet material comprising a backing and a coating of repositionable pressure-sensitive adhesive coated on at least one major surface of said backing, the adhesive comprising:

i) a plurality of polymeric, solid, elastomeric microspheres that are the reaction product of reactants comprising polymerizable starting materials comprising at least one $C_4$–$C_{14}$ alkyl (meth)acrylate monomer and at least one polar comonomer with the proviso that if the polar comonomer comprises a dissociable proton, the polar comonomer has no dissociable proton having a $K_d$ of greater than $10^{-3}$;

ii) a polymeric stabilizer in an amount of about 0.1 to about 3 parts by weight per 100 parts by weight of the microspheres; and iii) a surfactant in an amount of no greater than about 5 parts by weight per 100 parts by weight of the microspheres.

2. A sheet material according to claim 1, wherein the alkyl (meth)acrylate is selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, and isodecyl acrylate.

3. A sheet material according to claim 1, wherein the polar comonomer is selected from the group consisting of acrylic acid, N-vinyl pyrrolidone, N-vinyl caprolactam, vinyl pyridine, methacrylic acid, acrylamide, fumaric acid, itaconic acid, crotonic acid, acrylonitrile, methacrylonitrile, hydroxyethylacrylate, and hydroxyethyl methacrylate.

4. A sheet material according to claim 1, wherein the polymeric stabilizer is a salt of polyacrylic acid.

5. A sheet material according to claim 1, wherein the polymeric stabilizer is present in an amount of about 0.5 to about 2 parts by weight per 100 parts by weight of the microspheres.

6. A sheet material according to claim 1, wherein the surfactant is ammonium lauryl sulfate.

7. A sheet material according to claim 1, wherein the surfactant is present in an amount of no greater than 5 parts by weight per 100 parts by weight of the microspheres.

8. A sheet material according to claim 1, wherein the dry coating weight of adhesive is in the range of 0.4 to about 2 gms per square foot of surface area of the sheet material.

9. A sheet material according to claim 1, wherein the backing is about 2 to about 6 mils in thickness.

10. The sheet material according to claim 1 comprising a backing and a coating of repositionable pressure-sensitive adhesive coated on at least one major surface of said backing, the coating comprising a plurality of microspheres prepared according to the following process:
   a) stirring or agitating a mixture comprising polymerizable monomer starting materials comprising (1) at least one $C_1$–$C_{14}$ alkyl (meth)acrylate monomer; (2) a polar comonomer which, when the polar comonomer comprises a dissociable proton, has no dissociable proton having a $K_d$ greater than $10^{-3}$, (3) a catalytically effective amount of an initiator for the polymerizable monomer starting materials; (4) a polymeric stabilizer in an amount of about 0.1 to about 3 parts by weight per 100 parts by weight of the polymerizable monomer starting materials; (5) a surfactant in an amount of no greater than about 5 parts by weight per 100 parts by weight of the polymerizable monomer starting materials; and (6) water to form an oil in water suspension; and
   b) polymerizing the polymerizable monomer starting materials, wherein the microspheres are provided.

11. The sheet material according to claim 1 comprising a backing and a coating of repositionable pressure-sensitive adhesive coated on at least one major surface of said backing, the coating comprising a plurality of microspheres prepared by the following process:
   a) stirring or agitating a mixture comprising a polymerizable monomer starting materials comprising (1) at least one $C_1$–$C_{14}$ alkyl (meth)acrylate monomer; (2) a catalytically effective amount of an initiator for the polymerizable monomer starting materials; (3) a polymeric stabilizer in an amount of about 0.1 to about 3 parts by weight per 100 parts by weight of the polymerizable monomer starting materials; (4) a surfactant in an amount of no greater than about 5 parts by weight per 100 parts by weight of the polymerizable monomer starting materials; and (5) water to form an oil in water suspension; and
   b) at least partially polymerizing the polymerizable monomer starting materials;
   c) adding to the suspension a polar comonomer which, when the polar comonomer comprises a dissociable proton, has no dissociable proton having a $K_d$ greater than $10^{-3}$; and
   d) continuing the polymerization of the polymerizable monomer starting materials, wherein microspheres are provided.

* * * * *